(12) United States Patent
Beatty et al.

(10) Patent No.: US 10,216,281 B2
(45) Date of Patent: Feb. 26, 2019

(54) SYSTEMS AND METHODS FOR ADJUSTING POINT-OF-SALE INTERFACES

(71) Applicant: Clover Network, Inc., Sunnyvale, CA (US)

(72) Inventors: John Daniel Beatty, Emerald Hills, CA (US); Leonard Robert Speiser, Los Altos, CA (US); Angelique Julie Lausier, Palo Alto, CA (US); Tamer Mohamed El Calamawy, Redwood City, CA (US); Michael Joseph Quinlan, Sunnyvale, CA (US)

(73) Assignee: Clover Network, Inc., Sunnyvale, CA (US)

( * ) Notice: Subject to any disclaimer, the term of this patent is extended or adjusted under 35 U.S.C. 154(b) by 610 days.

(21) Appl. No.: 14/926,363

(22) Filed: Oct. 29, 2015

(65) Prior Publication Data

US 2016/0124627 A1    May 5, 2016

Related U.S. Application Data

(60) Provisional application No. 62/074,064, filed on Nov. 2, 2014.

(51) Int. Cl.
| | | |
|---|---|---|
| *G06Q 20/00* | (2012.01) | |
| *G06F 3/01* | (2006.01) | |
| *G06F 3/0484* | (2013.01) | |
| *G06F 1/16* | (2006.01) | |
| *G07G 1/00* | (2006.01) | |
| *G07G 1/01* | (2006.01) | |
| *G06Q 20/20* | (2012.01) | |

(52) U.S. Cl.
CPC ............ *G06F 3/017* (2013.01); *G06F 1/1694* (2013.01); *G06F 3/0484* (2013.01); *G06Q 20/202* (2013.01); *G07G 1/0018* (2013.01); *G07G 1/01* (2013.01); *G06F 2200/1614* (2013.01); *G06F 2200/1637* (2013.01)

(58) Field of Classification Search
CPC ......... G06Q 20/20; G06Q 3/0416; G06Q 3/60
See application file for complete search history.

(56) References Cited

U.S. PATENT DOCUMENTS 9,129,274 B1 *   9/2015   Mocko .................. G06Q 20/20

* cited by examiner

*Primary Examiner* — Ramsey Refai
(74) *Attorney, Agent, or Firm* — Daylight Law, P.C.

(57) ABSTRACT

Systems and methods are provided for adjusting point of sale (POS) interfaces. In some embodiments, a POS device includes a memory, a display and a sensor. The memory is configured to store data and computer-executable instructions. The display is configured to present a user interface, the user interface having a first interface and a second interface. The sensor is configured to detect an adjustment in a physical position of the POS device from a first position and from a second position. The first interface is presented in the first position and the second interface is presented in the second position. The first interface has a first set of functionalities that is prevented from being accessible in the second interface.

23 Claims, 5 Drawing Sheets

SYSTEMS AND METHODS FOR ADJUSTING POINT-OF-SALE INTERFACES

RELATED APPLICATIONS

This application claims priority to U.S. Provisional Patent Application No. 62/074,064, filed on Nov. 2, 2014 and entitled "Systems and Methods for Adjusting Point-of-Sale Interfaces," which is hereby incorporated by reference for all purposes.

BACKGROUND

Point-of-sale (POS) systems are computerized networks that enable merchants and customers to complete goods or services sales transactions. POS systems typically include a main computer, to which POS terminals are connected. POS terminals replace conventional cash registers, and can take the form of, for example, a personal computer or a mobile device. POS systems can include additional devices such as credit card readers, scanners, receipt printers, and can include customized applications such as for inventory control and accounting. As POS systems become more widely used, there continues to be a need for improved functionality and user-friendliness.

SUMMARY

In some embodiments, a point of sale (POS) device includes a memory, a display and a sensor. The memory is configured to store data and computer-executable instructions. The display is configured to present a user interface, the user interface having a first interface and a second interface. The sensor is configured to detect an adjustment in a physical position of the POS device from a first position and from a second position. The first interface is presented in the first position, and the second interface is presented in the second position. The first interface has a first set of functionalities that is prevented from being accessible in the second interface.

In some embodiments, a computer-implemented method includes receiving, by a POS device that includes one or more processors, a first indication of interaction with a merchant; and presenting, by the POS device in response to the first indication, a first user interface associated with the merchant. The method also includes detecting, by the POS device, an adjustment to an orientation of the POS device; determining, by the POS device, based on the adjustment to the orientation, that the POS device is to interact with a customer; and presenting, by the POS device in response to the determination, a second user interface associated with a customer interaction. The first user interface includes a first set of functionalities, and the second user interface is configured to prevent the first set of functionalities from being accessible to the customer.

In some embodiments, a POS system includes a display, a sensor, a memory and a processor. The processor is configured to access the memory. The process is also configured to execute the computer-executable instructions to: a) receive a first indication of interaction with a merchant; b) present, in response to the first indication, a merchant-associated interface associated with merchant interaction; c) detect, using the sensor, an adjustment to a physical position of the display; d) determine, based on the adjustment, that the POS device is to interact with a customer; and e) present, in response to the receipt, detection, or determination, a customer-associated interface associated with customer interaction. The customer-associated interface is restricted from accessing a first set of functionalities that is in the merchant-associated interface.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

Figure 1:
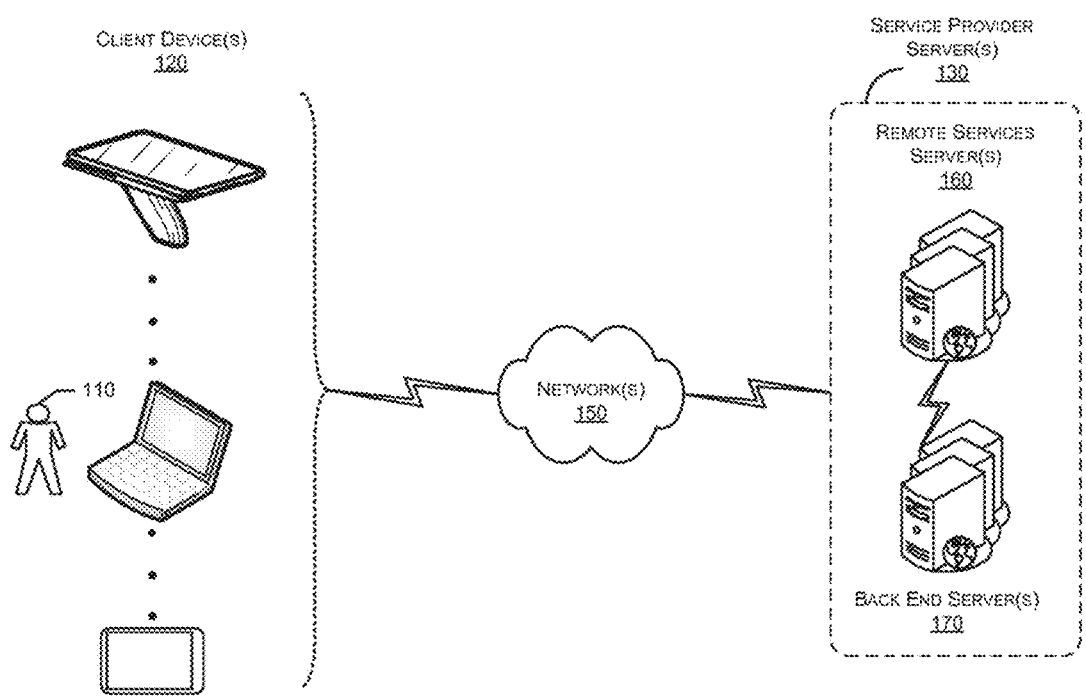
FIG. 1 illustrates an example network architecture for adjusting POS interfaces in accordance with one or more example embodiments.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like, but not necessarily the same or identical, elements throughout. Hence, if a feature is used across several drawings, the number used to identify the feature in the drawing where the feature first appeared will be used in later drawings.

DETAILED DESCRIPTION

Described herein are systems and methods for adjusting POS (point-of-sale) interfaces. In a typical transaction, the merchant and the customer may respectively interact with a POS device at different points of time in a sales or purchase transaction. The merchant may interact with the POS device to input the items to be purchased by the customer. The customer may interact with the POS device to complete the transaction. In the present disclosure, different user interfaces may be presented by the POS device depending on who and/or what entity is interacting with the POS device at a particular time during the transaction.

Broadly, the systems and methods described herein may facilitate adjusting a POS interface on a POS device in response to one or more user interactions with the POS device. According to one or more embodiments, the POS device may be configured to present a first interface or merchant-associated interface to a merchant, such as during interaction with the merchant. Furthermore, the POS device may be configured to detect a change in orientation and/or any other type of adjustment to the physical position of the POS device. For example, a merchant may interact with the POS device by inputting one or more line items to be purchased by a customer. After entering the line items, the merchant may turn, rotate, flip, and/or otherwise physically adjust the POS device and/or display to face the customer.

The POS device may be configured to detect the physical adjustment of the POS device. In response to this detection, the POS device may automatically adjust and/or change the first interface or merchant-associated interface to a second interface or customer-associated interface for interaction with the customer. In certain implementations, the second interface or customer-associated interface may be different from the first interface or merchant-associated interface and may prevent the customer from viewing and/or accessing certain features and/or information that may be accessible to the merchant via the first interface or merchant-associated interface.

In another embodiment, a POS device may be configured to present a first interface or merchant-associated interface to a merchant, such as during interaction with the merchant. Furthermore, the POS device may be configured to receive and/or detect an indication of a particular user input to the POS device and/or indication of one or more transaction events with respect to the POS device. For example, a merchant may interact with the POS device by inputting, to the POS device, one or more line items to be purchased by a customer. In response to receiving and/or detecting the merchant input, the POS device may automatically adjust and/or change the first interface or merchant-associated interface to a second interface or customer-associated interface for interaction with the customer. In certain implementations, the second interface or customer-associated may be different from the first interface or merchant-associated interface, and may prevent the customer from viewing and/or accessing certain features and/or information that may be accessible to the merchant via the first interface or merchant-associated interface.

According to one or more other embodiments of the disclosure, a computer-readable medium storing computer-executable instructions which, when executed by a processor, cause the processor to perform operations. The method may include receiving, by a point-of-sale (POS) device that includes one or more processors, a first indication of interaction with a merchant. The method may also include presenting, by the POS device in response to the first indication, a first user interface or merchant-associated interface associated with merchant interaction. Furthermore, the method may include detecting, by the POS device, an adjustment to an orientation of the POS device. In other embodiments, the method may include receiving and/or detecting an indication of a particular user input to the POS device and/or indication of one or more transaction events with respect to the POS device. Additionally, in any instance, the method may include determining, by the POS device based at least in part on the adjustment and/or indication, that the POS device is to interact with a customer. The method may also include presenting, by the POS device in response to the determination, a second user interface or customer-associated interface associated with customer interaction.

According to one or more other embodiments of the disclosure, a device is provided. The device may include at least one memory for storing data and computer-executable instructions. The device system may also include at least one processor to access the at least one memory and to execute the computer-executable instructions. The at least one processor may be configured to execute the instructions to receive a first indication of interaction with a merchant and present, in response to the first indication, a first user interface or merchant-associated interface associated with merchant interaction. The at least one processor may also be configured to execute the instructions to detect, an adjustment to an orientation of the POS device and determine, based at least in part on the adjustment, that the POS device is to interact with a customer. In other embodiments, the at least one processor may be configured to execute the instructions to receive and/or detect an indication of a particular user input to the POS device and/or indication of one or more transaction events with respect to the POS device. In any instance, the at least one processor may further be configured to present, in response to the receipt, detection, and/or determination, a second user interface or customer-associated interface associated with customer interaction.

According to one or more other embodiments of the disclosure, a non-transitory computer readable medium is provided. The computer readable medium may include computer-executable instructions that may be executed by at least one processor. When executed by the at least one processor, the computer-executable instructions may cause the at least one processor to perform operations including receiving a first indication of interaction with a merchant and presenting, in response to the first indication, a first user interface or merchant-associated interface associated with merchant interaction. The operations may also include detecting an adjustment to an orientation of the POS device and determining, based at least in part on the adjustment, that the POS device is to interact with a customer. In other embodiments, the operations may include receiving and/or detecting an indication of a particular user input to the POS device and/or indication of one or more transaction events with respect to the POS device. Furthermore, in any instance, the operations may include presenting, in response to the receipt, detection and/or determination, a second user interface or customer-associated interface associated with customer interaction.

Referring now to FIG. 1, there is shown an example network architecture 100 for adjusting POS interfaces in accordance with one or more certain embodiments of the disclosure. The network architecture 100 may include one or more client devices 120. The one or more client devices 120 may be a POS device, a mobile device, a laptop computer, a desktop computer, another device with computer functionalities, or any combination thereof and/or other types of devices associated with a merchant at various locations. For example, a client device, such as 120, may be purpose-built POS equipment, a self-service kiosk, a smart phone, a tablet, a wearable computer device, or an e-reader operating a mobile operating system, such as Android OS™. Each client device 120 may be coupled to one or more service provider servers 130 via a client API, which may be used to access the services and functionalities provided by the service provider servers 130. Each of the client devices 120 may communicate with the one or more service provider servers 130 via one or more networks 150.

According to one or more embodiments, the service provider servers may include one or more remote services servers 160 and one or more back-end servers 170. In some embodiments, the one or more remote services servers 160 may be a cloud-based computer system, where no on-premise servers are required, which may reduce relative cost and complexity of hardware, installation, and ongoing maintenance and administration.

The back-end servers 170 may be one or more independent computer systems, such as for performing back-end processes for sales transactions. The one or more back-end servers 170 may be coupled to the one or more remote services servers 160 via a back-end API. The back-end API may be an application programming interface for the one or more back-end servers 170 to supplement the services provided by the one or more remote services servers 160. The one or more back-end servers 170 and the one or more remote services servers 160 may communicate directly with each other and/or via the network 150.

The one or more networks 150 may be a system for communication. Each of the networks 150 may encompass a variety of mediums of communication, such as wired communication for one part and wireless communication for another part. The one or more networks 150 may be part of the Internet.

For example, a network, such as 150, may include an Ethernet or other wire-based network or a wireless NIC (WNIC) or wireless adapter for communicating with a wireless network, such as a WI-FI network. The network 150 may include any suitable network for any suitable communication interface. As an example and not by way of limitation, the network channel may include an ad hoc network, a personal area network (PAN), a local area network (LAN), a wide area network (WAN), a metropolitan area network (MAN), or one or more portions of the Internet or a combination of two or more of these networks. One or more portions of one or more of these networks may be wired or wireless. As another example, the network may be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the one or more networks 150 may use standard communications technologies and/or protocols. Thus, each network 150 may include links using technologies such as Ethernet, 802.11, worldwide interoperability for microwave access (WiMAX), 3G, 4G, CDMA, digital subscriber line (DSL), etc. Similarly, the networking protocols used on the network may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network may be represented using technologies and/or formats including the hypertext markup language (HTML) and the extensible markup language (XML). In addition, all or some of links may be encrypted using conventional encryption technologies such as secure sockets layer (SSL), transport layer security (TLS), and Internet Protocol security (IPsec).

Figure 2:
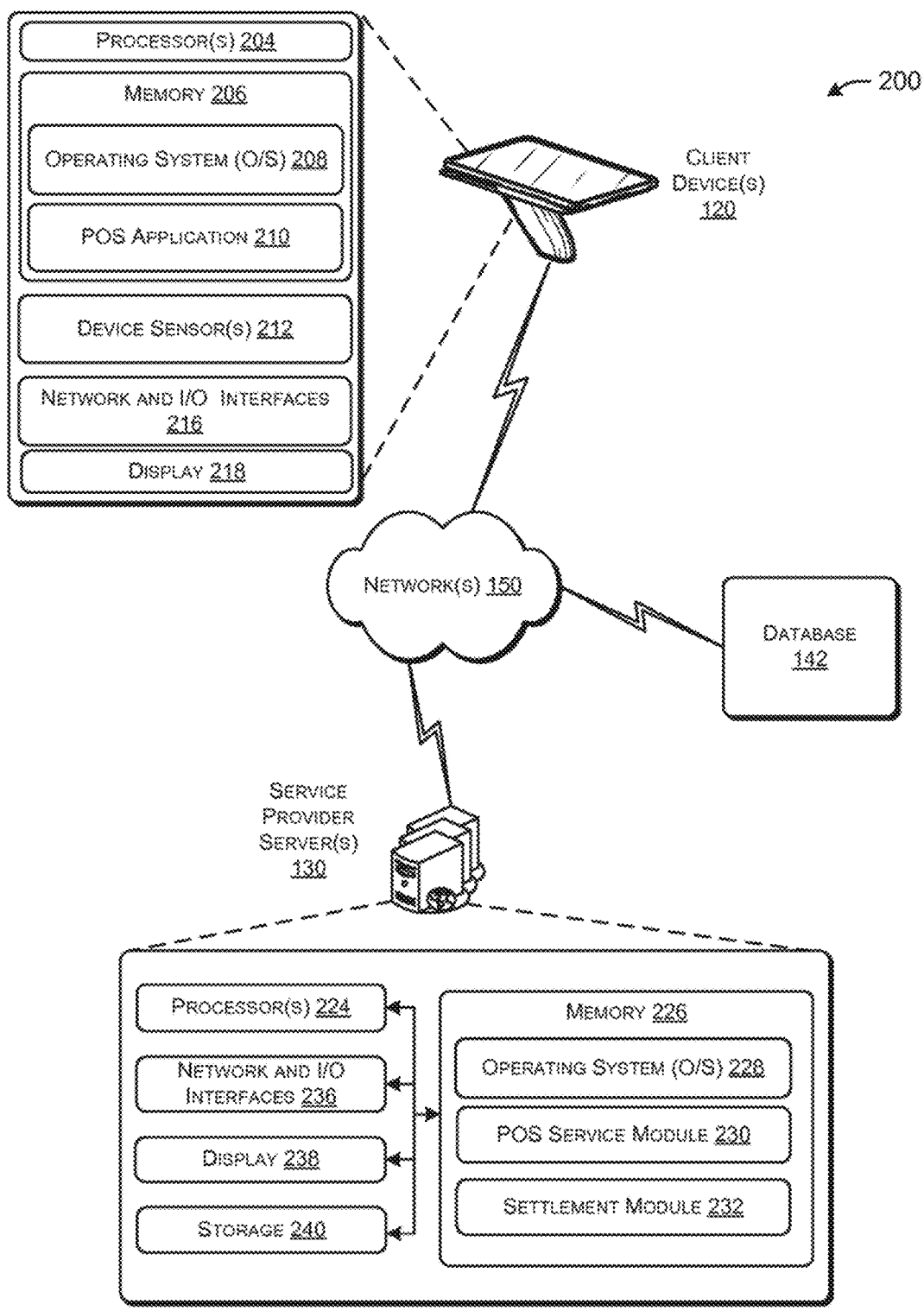
FIG. 2 illustrates another example system architecture for adjusting POS interfaces in accordance with one or more example embodiments.

With reference now to FIG. 2, a system 200 for adjusting POS interfaces is shown according to one or more embodiments of the disclosure. The system 200 may be incorporated in one or more client device(s) 120 (e.g., the client device(s) 120 illustrated in FIG. 1). The client device(s) 120 may include one or more computer processors 204, and a memory 206 storing an operating system 208 and a POS application 210. In addition, the client device(s) 120 may include one or more device sensor(s) 212, network and I/O interfaces 216, and a display 218. In certain embodiments, the one or more I/O interfaces 216 may be configured to present or otherwise output a user interface, such as a button or lock key, wherein a user can indicate that a subsequently displayed user interface to be output via the client device 120 (e.g., and/or its display 218) is to be rotated, flipped, moved, and/or otherwise adjusted, such as when a merchant transaction and/or operation, or a customer transaction and/or operation is to be initiated. In certain embodiments, the one or more device sensors 212 may be capable of gathering information associated with a present environment of the client device(s) 120, or similar hardware devices, such as a camera, microphone, antenna, a gesture capture or detection device, or Global Positioning Satellite (GPS) device. Furthermore, the one or more device sensors 212 may be configured to determine a change and/or adjustment to an orientation and/or position of the client device 120. For instance, the one or more device sensors 212 may be configured to determine whether the client device 120 (e.g., and/or its display 218) has been rotated, flipped, moved, and/or otherwise physically adjusted, such as by a user (e.g., a merchant, merchant employee, and/or customer) of the client device 120.

The computer processors 204 may comprise one or more cores and may be configured to access and execute (at least in part) computer-readable instructions stored in the memory 206. The one or more computer processors 204 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The client device 120 may also include a chipset (not shown) for controlling communications between the one or more processors 204 and one or more of the other components of the client device 120. In certain embodiments, the client device 120 may be based on an Intel® architecture or an ARM® architecture, and the processor(s) and chipset may be from a family of Intel® processors and chipsets. The one or more processors 204 may also include one or more application-specific integrated circuits (ASICs) or application-specific standard products (ASSPs) for handling specific data processing functions or tasks.

The memory 206 may include one or more computer-readable storage media (CRSM). In some embodiments, the memory 206 may include non-transitory media such as random access memory (RAM), flash RAM, magnetic media, optical media, solid state media, and so forth. The memory 206 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 206 may store an operating system 208 that includes a plurality of computer-executable instructions that may be implemented by the computer processor to perform a variety of tasks to operate the interface(s) and any other hardware installed on the client device 120. The memory 206 may also store content that may be displayed by the client device 120 or transferred to other devices (e.g., headphones) to be displayed or played by the other devices. The memory 206 may also store content received from the other devices. The content from the other devices may be displayed, played, or used by the client device 120 to perform any necessary tasks or operations that may be implemented by the computer processor or other components in the client device 120.

The network and I/O interfaces 216 may also include one or more communication interfaces or network interface devices to provide for the transfer of data between the client device 120 and another device (e.g., network server) via a network 150.

The display 218 may include, but is not limited to, a liquid crystal display, a light-emitted diode display, or an E-Ink™ display as made by E Ink Corp. of Cambridge, Mass. The display 218 may be used to show content to a user in the form of text, images, or video. In certain instances, the display 218 may also operate as a touch screen display that may enable the user to initiate commands or operations by touching the screen using certain finger or hand gestures.

The client device(s) 120 may also be in communication with one or more service provider server(s) 130 (e.g., the service provider server(s) 130 illustrated in FIG. 1), such as via a network 150. The one or more service provider servers 130 may include one or more processors 224 and at least one memory 226, which may store an operating system 228, a POS service module 230, and a settlement module 232. Furthermore, the one or more service provider servers 130 may include network and I/O interfaces 236, a display 238, and storage 240. In some implementations, the one or more service provider servers 130 may be associated with one or more financial institutions and/or financial systems. As previously discussed, the service provider server(s) 130 may include multiple servers, such as one or more remote service servers 160 and/or one or more back-end servers 170. As such, in certain implementations, the functionalities associated with the POS service module 230 and the settlement module 232 may be performed by separate servers. For example, the functionality of the POS service module 230 may be implemented by the remote service server(s) 160, and the functionality of the settlement module 232 may be implemented by the back-end server(s) 170.

In general, the client device 120 and service provide server(s) 130 may interact to facilitate purchase transactions associated with one or more items associated with a merchant. In some embodiments, the client device(s) 120 may be located at one or more respective locations (e.g., restaurants, hardware stores, malls, etc.). As explained above, the client devices 120 may be implemented by a computer system, which may be controlled by operating system software (e.g., operating system 208). For illustrative purposes, the operating system, such as 208, may be, for example, an Android-based operating system, which may communicate with a POS application 210 (e.g., First Data and/or Clover® services, or any other services that relate to a point-of-sale system). Additionally, one or more aspects of the POS application 210 may include other applications and/or modules that may be built-in or otherwise provided by third-party applications. For example, one or more aspects of the POS application 210 may include a register module, which may be configured to provide an interface for an operator of the merchant/business to facilitate sales transactions. The register module may have bar code scanner functionality, check-out functionality, payment functionality, or any combination thereof. It will be appreciated that the register module is one of many possible modules that may exist within POS application 210 on the client device(s) 120 and that other modules may be implemented.

According to certain embodiments, a user (e.g., a merchant) may use the client device 120 to create a customer order for a product. The merchant may, via the client device 120, generate an order identifier and associate it with the order. For example, if a customer places an order for a certain product, the product may be inserted into the order as a line item. The line item for the product may have an identifier associated with it. The order may be stored on the client device 120, which in turn may store the order and associated identifier information in a local database or other datastore. The order may then be put into a queue displayed by the POS device 202. The order may be stored in a data object, and the data object may be stored in the queue.

In some embodiments, the merchant may obtain payment information from the customer, such as by swiping a credit card or other payment device using a reader associated with the client device 120. The credit card or payment device information may be encrypted by the client device 120 (e.g., via the POS application 210), and stored by the client device 120 in an object associated with the order. In some embodiments, the merchant may select a tender type (e.g., credit card, debit card, gift card, payment device, etc.) via the client device 120. The payment information may be stored by the client device 120 in a data object, and the data object may then be placed into the queue displayed by the client device 120 as the next item after the corresponding order.

Additionally, the client device 120 (e.g., via the POS application 210) may transmit the items in the queue to one or more service provider server(s) 130. If the client device 120 is not able to communicate with the server, such as 130, the order items may be stored by the client device 120 in the queue until a connection to the server 130 can be established. Once the client device 120 is able to communicate with the server 130, items in the queue may be transmitted to the server 130 for processing. Upon receipt of the items in the queue, the POS service module 230, may process the items, such as by adding the items to remote databases, processing payments, and communicating items back to one or more client devices 120 for further processing. For example, if there are multiple client devices 120 being utilized by merchants, and each merchant is creating and transmitting orders to the server 130, the POS service module 230 may aggregate the orders, which may be based on time of receipt of the orders, and transmit the aggregated orders to at least one of the or multiple client devices 120 for fulfillment of the orders.

In some embodiments, the POS service module 230 may be configured to update multiple databases based on the items in an order. For example, the product line item in the above example may be decremented from an inventory database, may be added to a sales database, and/or the like. The update to the different databases may trigger synchronization across some or all of the client devices 120. This may enable the merchant to have suitable information when interacting with a customer. For example, if the product is ordered, and it is the last product available, some or all of the client devices may be updated so that merchants can be alerted or otherwise notified that they may no longer take orders for certain products.

In some embodiments, the client device 120 and/or POS application 210 may be an open platform, which may provide access to third-party developers to develop their own applications to augment or provide further functionality to client device 120 and/or POS application 210. For example, using any number of application program interfaces (APIs) or similar structures, data may be pulled from the system, and data may be pushed into the system. This may enable third-party developers to develop applications that may run concurrently with the system and augment system functionality.

In one embodiment, the additional functionality may be based upon one or more predetermined preferences (e.g., merchant preferences, system administrator preferences, location preferences, type of store preferences, customer preferences etc.). By way of example, in the case where client devices 120 may be co-located in one location (e.g., a restaurant), if a merchant initiates and/or modifies a transaction (e.g., creating/modifying a purchase order of a product or a service) on a client device 120, respective the POS application 210 associated with the client device 120 may broadcast to other client devices that a change to a transaction occurred. A change to a transaction may be, for example, adding new items to the order, adding taxes, applying coupons, adding a special notice of the transaction, or any other changes associated with the transaction. In the above example, the client devices may be co-located; however, it is understood that this is only an example, and client devices may be located at different locations.

Figure 3A:
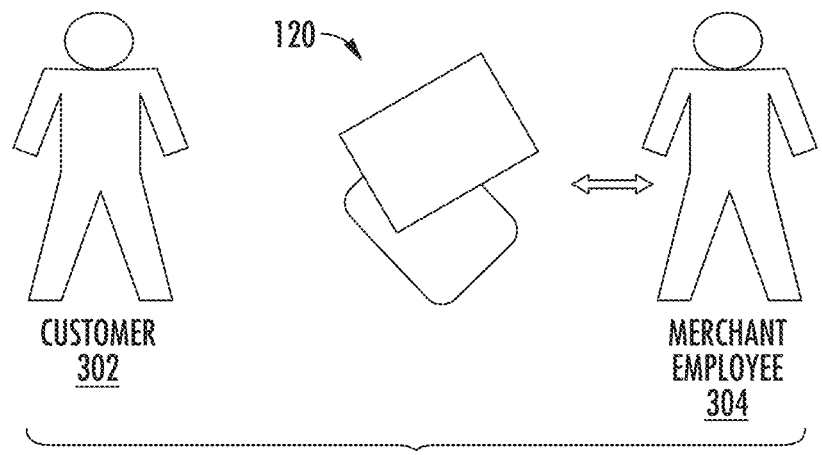
FIG. 3A illustrates a diagram of example interactions between a merchant and a POS device in accordance with one or more example embodiments.

Still referring to FIG. 2, additional functionalities and interaction between the client device(s), the service provider server(s) 130, merchant(s), and/or customer(s) will now be described in conjunction with references to FIGS. 3A and 3B. According to one or more embodiments, the client device(s) 120 may be a POS device at a merchant location, such as a merchant store and/or the like. As shown in FIG. 3A, the client device 120 may be configured to present, via the POS application 210, a first user interface (e.g., a merchant or merchant-associated interface) to interact with a merchant employee 304 associated with the merchant. For instance, the merchant interface may enable the merchant employee 304 to create and/or otherwise generate one or more line items associated with items that a customer 302 may wish to purchase. Furthermore, the merchant interface may enable the merchant employee 304 to access one or more restricted functionalities available only to the merchant. For instance, the merchant interface may enable the merchant employee 304 to access certain aspects of the POS application 210 and/or operating system 208 of the client device 120 via one or more selectable components (e.g., interface buttons, radials, menus, fields, and/or the like). In addition, the merchant interface may display and/or otherwise enable the merchant employee 304 to access private information stored by and/or otherwise associated with the merchant, such as sales records, customer information, and/or the like.

Figure 3B:
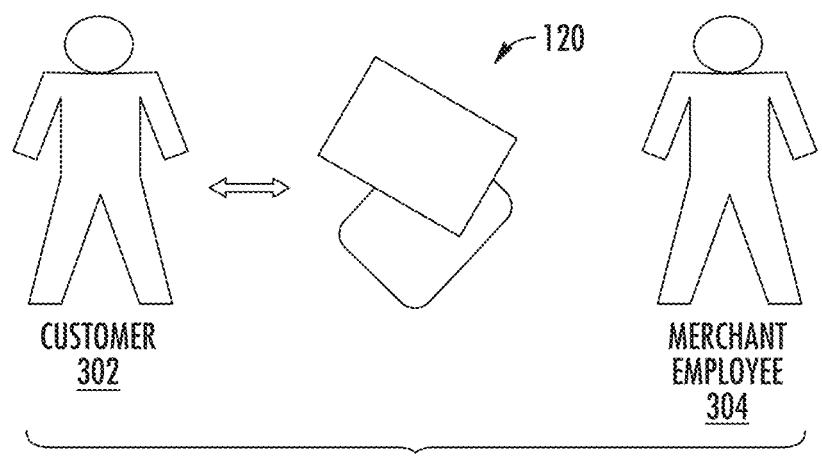
FIG. 3B illustrates a diagram of example interactions between a customer and a POS device in accordance with one or more example embodiments.

In certain implementations, and as shown in FIG. 3B, in order to initiate a payment transaction for the items listed in the line items created by merchant employee 304, the merchant employee 304 may adjust the orientation and/or physical position of the client device 120 such that the display 218 faces the customer 302. As previously discussed, the device sensor(s) 212 of the client device 120 may detect the change and/or adjustment in the position or orientation of the client device 120. Furthermore, the device sensors 212 may transmit and/or otherwise provide an indication of the change and/or adjustment to the POS application 210.

In certain implementations, in order to initiate a payment transaction for the items listed in the line items created by a merchant employee, the merchant employee 304 may input a particular indication via a button or lock key associated with a user interface of the client device 120. As previously discussed, the client device 120 may detect the indication, and may initiate a change and/or adjustment in the position or orientation of the user interface of the client device 120. In this manner, the user interface may rotate, flip, or otherwise adjust according to whether a merchant or a customer is to interact with the client device 120.

In any instance, in response to receiving the indication, the POS application 210 may be configured to change and/or adjust the merchant interface. In certain implementations, the POS application 210 may be configured to present a second interface (e.g., a customer or customer-associated interface) to facilitate customer interaction with the client device 120. For example, the customer interface may display information associated with the line items to customer 302 (e.g., information associated with product details, pricing, and/or the like). Furthermore, the customer interface enables the customer 302 to input, submit, and/or otherwise provide payment information to the client device 120. The payment information may be provided toward the customer's purchase of the item(s) listed in the one or more line items. In addition, according to some embodiments, the customer interface prevents the customer 302 from having the ability to access the restricted functionality available to the merchant via the merchant interface. For instance, the customer interface may not include the selectable components, such as those provided by the merchant interface, that are used to access restricted functionality and/or other aspects associated with the POS application 210 or the operating system 208. In addition, the customer interface may not display the private information associated with the merchant that may be provided by the merchant interface. In other words, the customer interface may be a "locked down" version of the merchant interface with restricted access to certain functionality of the POS application 210 and/or operating system 208.

Moreover, upon entering the payment information via the customer interface, the customer may adjust the orientation and/or position of the client device 120 again, such that the client device 120 and/or display 218 faces the merchant employee 304. As such, the device sensor(s) 212 may detect the change and/or adjustment in the orientation or position of the client device 120. The device sensor(s) 212 may further be configured to submit a second indication associated with the adjustment to the POS application 210. In response to receiving the second indication, the POS application 210 may be configured to switch from the customer interface back to the merchant interface. To this end, the merchant interface may interact with the merchant employee 304 to facilitate completion of a payment transaction for the item(s) listed in the line items.

According to one or more embodiments, the POS application 210 may submit the payment information, received from the customer 302, to the service provider server(s) 130. The payment information may be provided to the settlement module 232, which may be configured to settle the payment transaction for the items according to the payment information.

Figure 3C:
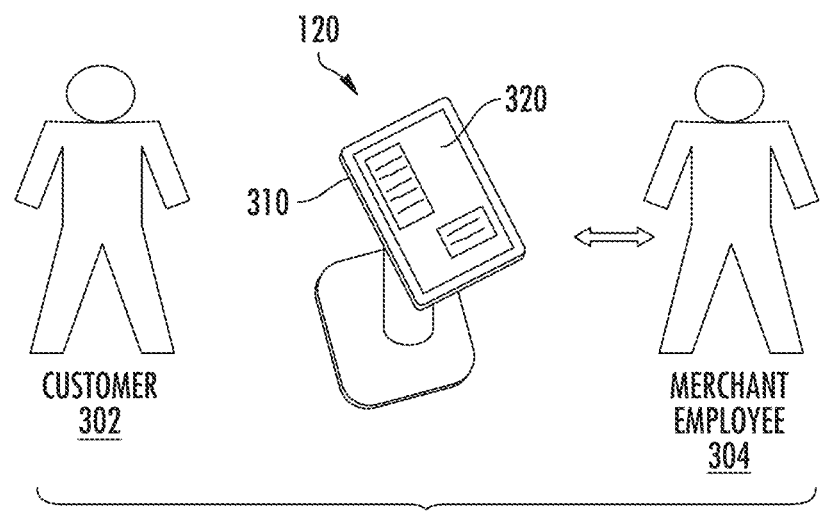
FIG. 3C illustrates a diagram of example interactions between a merchant and a POS device in accordance with further example embodiments.
Figure 3D:
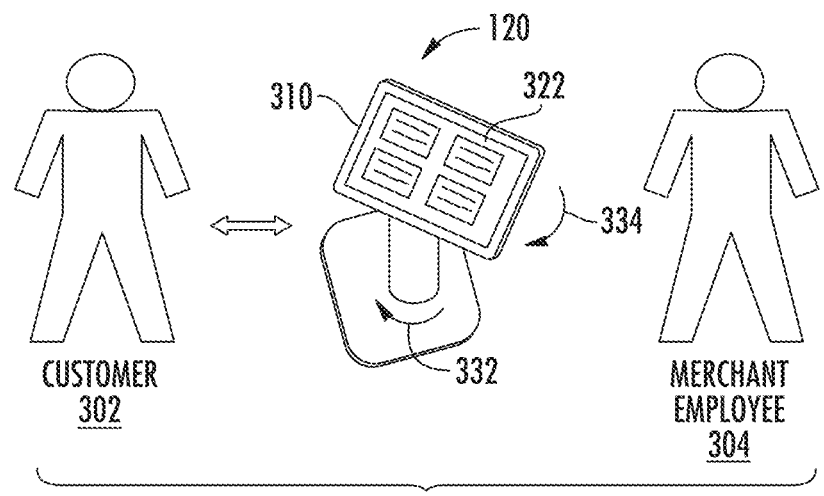
FIG. 3D illustrates a diagram of example interactions between a customer and a POS device in accordance with further example embodiments.

FIGS. 3C and 3D show adjustments to a physical position and/or orientation of a client device 120. In FIGS. 3C and 3D, customer 302 and merchant employee 304 interact with a client device 120. Client device 120 has a display 310, on which a user interface is presented. In FIG. 3C, the client device 120 is in a first position, facing the merchant employee 304. A first user interface 320, such as a merchant-associated interface, is presented on display 310. The first user interface 320 may include, for example, functionality allowing the merchant employee 304 to generate one or more line items associated with items to be purchased by the customer 302, access to a first set of functionalities that are available only to the merchant 304, and/or a button or lock key associated with the first user interface 320. In FIG. 3D, the client device 120 has been adjusted in its physical position to a second position, where in this embodiment the display 310 has been rotated to face the customer 302, as indicated by arrow 332, and the display 310 has also been changed in orientation by turning, as indicated by arrow 334. In this second position shown in FIG. 3D, a second user interface 322 is presented. Second user interface 322 has been adjusted compared to first user interface 320, by having its orientation turned per arrow 334. Second user interface 322 is different from first user interface 320 in that it presents features that are different from first user interface 320, such as by presenting customer-associated features. The second user interface 322 may be, for example, a customer-associated interface that facilitates customer payment of items being purchased. Thus, FIGS. 3C and 3D demonstrate that the first user interface 320 and second user interface 322 can be rotated, flipped, moved, or otherwise adjusted according to whether the merchant 304 or customer 302 is to interact with the client (i.e., POS) device 120. In some embodiments, the client device 120 can be repeatedly moved between the first position of FIG. 3C and second position of FIG. 3D as needed, in order to complete the interactions between the customer 302 and merchant 304. As in previous embodiments, the device sensor(s) 212 of the client device 120 may detect the change and/or adjustment in the position of the client device 120. Furthermore, the device sensor(s) 212 may transmit and/or otherwise provide an indication of the change and/or adjustment to the POS application 210. For example, the device sensor(s) 212 may be configured to detect when the physical position of the POS device is adjusted from the first position of FIG. 3C, and to detect when the position is adjusted from the second position of FIG. 3D. When an adjustment is detected, the POS device can be configured to automatically change the first user interface 320 to the second user interface 322, or vice versa, where the change can include an adjustment of the user interfaces 320 and/or 322 such as by modifying the orientation.

Figure 4:
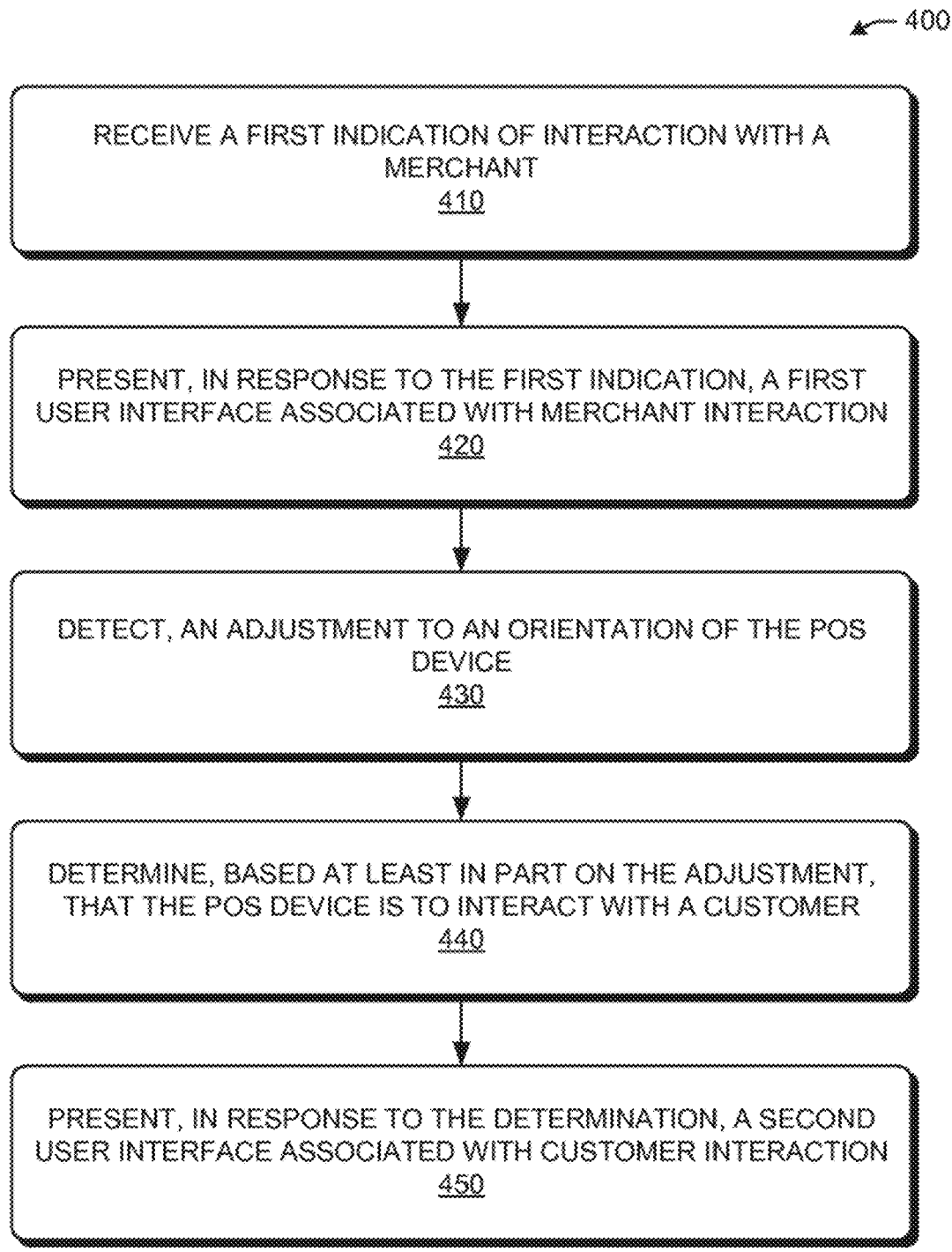
FIG. 4 illustrates a flow diagram of an example method for adjusting POS interfaces in accordance with one or more example embodiments.

Turning now to FIG. 4, a flow diagram of a method 400 for adjusting POS interfaces is shown in accordance with one or more example embodiments. The method 400 may include block 410, in which a POS device, such as a client device 120, may receive a first indication of interaction with a merchant. In block 420, the POS device may present, in response to the first indication, a first user interface or merchant-associated interface associated with merchant interaction. In block 430, the POS device may detect an adjustment to an orientation of the POS device. In block 440, the POS device may determine, based at least in part on the adjustment, that the POS device is to interact with a customer. In block 450, the POS device may be configured to present, in response to the determination, a second user interface or customer-associated interface associated with customer interaction.

In another embodiment, a method for adjusting POS interfaces in accordance with one or more example embodiments can include some or all of the following operations. The method may include a block, in which a POS device, such as a client device 120, may receive a first indication of interaction with a merchant. In a following block, the POS device may present, in response to the first indication, a first user interface or merchant-associated interface associated with merchant interaction. In a following block, the POS device may receive and/or detect an indication of a particular user input to the POS device and/or indication of one or more transaction events with respect to the POS device. In a following block, the POS device may determine, based at least in part on the indication that the POS device is to interact with a customer. In a following block, the POS device may be configured to present, in response to the determination, a second user interface or customer-associated interface associated with customer interaction.

In example embodiments of the disclosure, there may be a computer-implemented method. The method may include receiving, by a point-of-sale (POS) device including one or more processors, a first indication of interaction with a merchant. The method may include presenting, by the POS device in response to the first indication, a first user interface associated with merchant interaction. The method may include detecting, by the POS device, an adjustment to an orientation of the POS device. The method may include determining, by the POS device based at least in part on the adjustment, that the POS device is to interact with a customer. The method may include presenting, by the POS device in response to the determination, a second user interface associated with customer interaction. The first user interface may be configured to provide, to the merchant, a first set of functionalities associated with the POS device. The first set of functionalities may include at least one of selectable operating system components or a display of private information associated with the merchant. The second user interface may be configured to prevent the first set of functionalities from being accessible to the customer. The second interface may be configured to facilitate customer payment of one or more items. The first interface may be configured to facilitate a creation of one or more line items associated with one or more items to be purchased by the customer. The method may further include receiving, by the POS device via the second interface, payment information associated with a purchase of one or more items. The method may further include detecting, by the POS device, a second adjustment to the orientation of the POS device, determining, by the POS device based at least in part on the second adjustment, that the POS device is to interact with the merchant, and presenting, by the POS device in response to the determination, a third user interface associated with merchant interaction, wherein the third user interface is configured to facilitate payment of the one or more items according to the payment information.

According to example embodiments of the disclosure, there may be a point-of-sale (POS) device. The point-of-sale (POS) device may include at least one memory storing computer-executable instructions and at least one processor, wherein the at least one processor may be configured to access the at least one memory and to execute computer-executable instructions. The at least one processor may be configured, in response to execution of the instructions, to receive a first indication of interaction with a merchant. The at least one processor may be configured, in response to execution of the instructions, to present, in response to the first indication, a first user interface associated with merchant interaction. The at least one processor may be configured, in response to execution of the instructions, to detect an adjustment to an orientation of the POS device. The at least one processor may be configured, in response to execution of the instructions, to determine, based at least in part on the adjustment, that the POS device is to interact with a customer. The at least one processor may be configured, in response to execution of the instructions, to present, in response to the determination, a second user interface associated with customer interaction. The first user interface may be configured to provide, to the merchant, a first set of functionalities associated with the POS device. The first set of functionalities may include at least one of selectable operating system components or a display of private information associated with the merchant. The second user interface may be configured to prevent the first set of functionalities from being accessible to the customer. The second interface may be configured to facilitate customer payment of one or more items. The first interface may be configured to facilitate a creation of one or more line items associated with one or more items to be purchased by the customer. The at least one processor may be further configured, in response to execution of the instructions, to receive, by the POS device via the second interface, payment information associated with a purchase of one or more items. The at least one processor may be further configured, in response to execution of the instructions, to detect by the POS device, a second adjustment to the orientation of the POS device, determine, by the POS device based at least in part on the second adjustment, that the POS device is to interact with the merchant, and present, by the POS device in response to the determination, a third user interface associated with merchant interaction, wherein the third user interface is configured to facilitate payment of the one or more items according to the payment information.

In example embodiments of the disclosure, there may be a computer-readable medium storing computer-executable instructions which, when executed by a processor, cause the processor to perform operations. The operations may include receiving a first indication of interaction with a merchant. The operations may include presenting, in response to the first indication, a first user interface associated with merchant interaction. The operations may include detecting an adjustment to an orientation of the POS device. The operations may include determining, based at least in part on the adjustment that the POS device is to interact with a customer. The operations may include presenting, in response to the determination, a second user interface associated with customer interaction. The first user interface may be configured to provide, to the merchant, a first set of functionalities associated with the POS device. The first set of functionalities may include at least one of selectable operating system components or a display of private information associated with the merchant. The second user interface may be configured to prevent the first set of functionalities from being accessible to the customer. The second interface may be configured to facilitate customer payment of one or more items. The first interface may be configured to facilitate a creation of one or more line items associated with one or more items to be purchased by the customer. The operations may further include receiving, by the POS device via the second interface, payment information associated with a purchase of one or more items. The operations may further include detecting, by the POS device, a second adjustment to the orientation of the POS device, determining, by the POS device based at least in part on the second adjustment, that the POS device is to interact with the merchant, and presenting, by the POS device in response to the determination, a third user interface associated with merchant interaction, wherein the third user interface is configured to facilitate payment of the one or more items according to the payment information.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A point of sale (POS) device comprising:
   a memory storing data and computer-executable instructions;
   a display configured to present a user interface, the user interface comprising a first interface and a second interface; and
   a sensor configured to detect an adjustment in a physical position of the POS device from a first position and from a second position;

wherein the first interface is presented in the first position and the second interface is presented in the second position; and wherein the first interface has a first set of functionalities that is prevented from being accessible in the second interface.

2. The POS device of claim 1, wherein the first interface is a merchant-associated interface and the second interface is a customer-associated interface, the first set of functionalities being accessible only by a merchant.

3. The POS device of claim 2, wherein:
the first interface is configured to facilitate a creation of one or more line items by the merchant, the one or more line items being associated with one or more items to be purchased by a customer; and
the second interface is configured to facilitate customer payment of the one or more items.

4. The POS device of claim 2, wherein in the first position the display faces the merchant, and in the second position the display faces a customer.

5. The POS device of claim 1, wherein the first interface is a merchant interface and the second interface is a locked down version of the first interface.

6. The POS device of claim 1, wherein the adjustment in the physical position is a change in orientation selected from a group consisting of: turning, rotating, flipping, or moving.

7. The POS device of claim 6, wherein:
the adjustment in the physical position is a change in orientation by turning; and
the user interface rotates, flips, moves, or is otherwise adjusted according to whether a merchant or a customer is to interact with the POS device.

8. The POS device of claim 1, wherein the computer-executable instructions are configured to:
receive an indication, from the sensor, of the adjustment to the physical position of the POS device; and
present either the first interface or the second interface in response to receiving the indication from the sensor.

9. The POS device of claim 1, wherein the computer-executable instructions are configured to:
receive an indication of a user input to the POS device; and
present either the first interface or the second interface in response to receiving the indication of the user input.

10. A computer-implemented method comprising:
receiving, by a point of sale (POS) device that includes one or more processors, a first indication of interaction with a merchant;
presenting, by the POS device in response to the first indication, a first user interface associated with the merchant;
detecting, by the POS device, an adjustment to an orientation of the POS device;
determining, by the POS device, based on the adjustment to the orientation, that the POS device is to interact with a customer; and
presenting, by the POS device in response to the determination, a second user interface associated with a customer interaction;
wherein the first user interface includes a first set of functionalities, and the second user interface is configured to prevent the first set of functionalities from being accessible to the customer.

11. The method of claim 10, wherein the first indication of interaction with the merchant comprises a) generation of one or more line items associated with items to be purchased by the customer, b) access of the first set of functionalities that are available only to the merchant, or c) input via a button or lock key associated with the first user interface.

12. The method of claim 10, wherein the first set of functionalities comprises an ability to view or access private information including sales records, customer information, or merchant information.

13. The method of claim 10, wherein the first user interface is a merchant interface and the second user interface is a locked down version of the first user interface.

14. The method of claim 10, wherein:
the detecting is performed by a sensor of the POS device; and
the adjustment detected by the sensor is a change in the orientation to a first position.

15. The method of claim 10, further comprising:
detecting, by the POS device, a second adjustment to the orientation of the POS device;
determining, by the POS device based on the second adjustment, that the POS device is to interact with the merchant; and
presenting, by the POS device in response to the determination based on the second adjustment, a third user interface associated with merchant interaction.

16. The method of claim 15, wherein:
the first user interface is configured to facilitate a creation of one or more line items associated with one or more items to be purchased by the customer;
the second user interface is configured to receive payment information associated with the purchase of the one or more items; and
the third user interface is configured to facilitate payment of the one or more items according to the payment information.

17. The method of claim 10, wherein the adjustment to the orientation comprises turning, rotating, flipping, or moving the POS device to face the merchant or the customer.

18. A point of sale (POS) system comprising:
a display;
a sensor;
a memory storing data and computer-executable instructions; and
a processor configured to access the memory, the processor also being configured to execute the computer-executable instructions to:
receive a first indication of interaction with a merchant;
present, in response to the first indication, a merchant-associated interface associated with merchant interaction;
detect, using the sensor, an adjustment to a physical position of the display;
determine, based on the adjustment, that the POS system is to interact with a customer; and
present, in response to the receipt, detection, or determination, a customer-associated interface associated with customer interaction;
wherein the customer-associated interface is restricted from accessing a first set of functionalities that is in the merchant-associated interface.

19. The POS system of claim 18, wherein the first indication of interaction with the merchant comprises a) generation of one or more line items associated with items to be purchased by the customer, b) access of the first set of functionalities that are available only to the merchant, or c) input via a button or lock key associated with the merchant-associated interface.

20. The POS system of claim 18, wherein the merchant-associated interface is a merchant interface and the customer-associated interface is a locked down version of the customer-associated interface.

21. The POS system of claim 18, wherein:
the adjustment to the physical position is a change in orientation selected from a group consisting of: turning, rotating, flipping, or moving; and
the adjustment includes adjusting the physical position to face the merchant or the customer.

22. The POS system of claim 18, wherein the customer-associated interface is rotated, flipped, moved, or otherwise adjusted in response to the determination that the POS system is to interact with the customer.

23. The POS system of claim 18, wherein the physical position comprises a) a first position in which the display faces the merchant, wherein the merchant-associated interface is presented in the first position, and b) a second position in which the display faces the customer, wherein the customer-associated interface is presented in the second position.

* * * * *